US012680023B1

(12) United States Patent
Girletz

(10) Patent No.: US 12,680,023 B1
(45) Date of Patent: Jul. 14, 2026

(54) COMPOSITION AND METHOD FOR EQUINE ARENA FOOTING TREATMENT

(71) Applicant: Logan Kyle Girletz, Didsbury (CA)

(72) Inventor: Logan Kyle Girletz, Didsbury (CA)

(73) Assignee: Logan Kyle Girletz, Alberta (CA)

( * ) Notice: Subject to any disclaimer, the term of this patent is extended or adjusted under 35 U.S.C. 154(b) by 0 days.

(21) Appl. No.: 19/257,600

(22) Filed: Jul. 2, 2025

(51) Int. Cl.
| | |
|---|---|
| *C11D 1/72* | (2006.01) |
| *A63K 1/00* | (2006.01) |
| *C09K 17/48* | (2006.01) |
| *E01C 21/00* | (2006.01) |
| *E02D 3/12* | (2006.01) |

(52) U.S. Cl.
CPC .............. *C09K 17/48* (2013.01); *A63K 1/00* (2013.01); *E01C 21/00* (2013.01); *E02D 3/12* (2013.01); *E02D 2300/0006* (2013.01); *E02D 2300/0045* (2013.01)

(58) Field of Classification Search
CPC ......... C11D 3/3773; C11D 3/046; C11D 1/72; C09K 17/48; A63K 1/00; E01C 21/00; E02D 3/12; E02D 2300/0006; E02D 2300/0045
See application file for complete search history.

(56) References Cited

U.S. PATENT DOCUMENTS

| | | | | | |
|---|---|---|---|---|---|
| 4,793,741 | A | * | 12/1988 | Lahalih .................. | C09K 17/28 |
| | | | | | 405/270 |
| 5,185,024 | A | | 2/1993 | Siemer | |
| 5,242,248 | A | * | 9/1993 | Bramwell ................ | C09K 3/22 |
| | | | | | 405/258.1 |
| 6,669,752 | B2 | | 12/2003 | Arnold | |
| 6,889,471 | B2 | | 5/2005 | Arnold et al. | |
| 8,076,391 | B2 | | 12/2011 | Roa-Espinosa | |
| 8,410,194 | B1 | | 4/2013 | Orts et al. | |
| 8,453,377 | B2 | | 6/2013 | Thrash et al. | |
| 10,716,267 | B2 | | 7/2020 | Womack | |
| 2010/0300330 | A1 | * | 12/2010 | Hamilton ........... | C04B 20/1025 |
| | | | | | 524/4 |
| 2018/0112130 | A1 | | 4/2018 | Wallace | |

(Continued)

FOREIGN PATENT DOCUMENTS

| | | | | |
|---|---|---|---|---|
| CA | 2502002 | A | 10/2003 | |
| CN | 101624448 | A * | 1/2010 | ........... C08L 19/003 |
| CN | 101654296 | A * | 2/2010 | |

(Continued)

*Primary Examiner* — Edwin J Toledo-Duran
(74) *Attorney, Agent, or Firm* — Jordan Sworen; Daniel Enea; Argus Intellectual Enterprise, LLC

(57) ABSTRACT

A composition and method for enhancing equine arena footing using a polyacrylamide and coagulant system is provided. The composition for enhancing equine arena footing includes a dry granular composition including polyacrylamide (PAM) and a coagulant. This composition is designed to be mixed with water to form a solution, which is then applied to and incorporated into equine arena footing. The polyacrylamide and coagulant are present in a synergistic ratio, which effectively suppresses dust, significantly reduces water evaporation, and optimally conditions the footing. The synergistic combination provides enhanced and long-lasting dust control, coupled with improved footing quality, thereby substantially reducing water consumption and ongoing maintenance efforts in equine arenas.

16 Claims, 1 Drawing Sheet

(56)　　　　　　References Cited

U.S. PATENT DOCUMENTS

2020/0361832 A1　　11/2020　Pyle
2022/0177369 A1*　6/2022　Hendrickson .......... B01J 20/262

FOREIGN PATENT DOCUMENTS

| CN | 102040294 | A | * | 5/2011 | |
|----|-----------|---|---|---------|---------------|
| CN | 102617066 | A | * | 8/2012 | |
| CN | 102040294 | B | * | 7/2013 | ........... C11D 3/3773 |
| CN | 103362132 | A | * | 10/2013 | |
| CN | 104193211 | B | * | 6/2016 | |
| CN | 111995284 | A | * | 11/2020 | ............. C04B 28/04 |
| CN | 111088117 | B | * | 4/2021 | ........... C11D 3/3773 |
| CN | 112794681 | A | * | 5/2021 | ............. C04B 28/00 |
| JP | 2002177992 | A | * | 6/2002 | |
| JP | 3795780 | B2 | * | 7/2006 | |
| KR | 102857846 | B1 | * | 9/2025 | .............. E02D 3/12 |
| WO | 199616141 | A1 | | 5/1996 | |

* cited by examiner

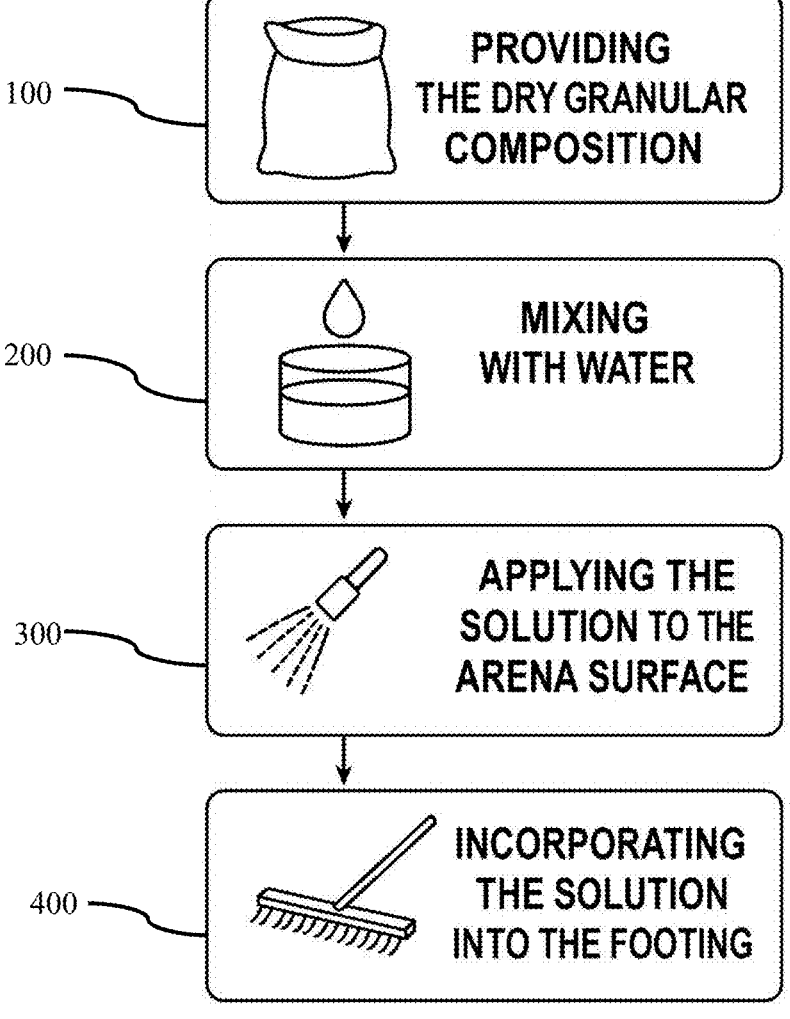
100 — PROVIDING THE DRY GRANULAR COMPOSITION
200 — MIXING WITH WATER
300 — APPLYING THE SOLUTION TO THE ARENA SURFACE
400 — INCORPORATING THE SOLUTION INTO THE FOOTING

COMPOSITION AND METHOD FOR EQUINE ARENA FOOTING TREATMENT

BACKGROUND OF THE INVENTION

The present invention relates to compositions and methods for maintaining optimal conditions in equine performance arenas and other equestrian surfaces. More specifically, the present invention addresses the persistent challenges of dust control and footing stability in these environments, which are critical for the health and safety of horses and riders, as well as for maximizing athletic performance.

Throughout the history of equestrian sport and training, the management of arena footing has been a constant concern. Dry and dusty conditions not only obscure visibility but also pose significant respiratory health risks to both horses and humans, potentially leading to chronic conditions such as heaves in equine athletes. Conversely, footing that is too wet, inconsistent, or lacks proper structure can lead to undue stress on tendons, ligaments, and joints, increasing the risk of lameness, falls, and debilitating injuries. Maintaining an ideal surface requires consistent effort and significant resources.

Throughout the history of equestrian sport and training, the management of arena footing has been a constant concern. Dry and dusty conditions not only obscure visibility but also pose significant respiratory health risks to both horses and humans, potentially leading to chronic conditions such as heaves in equine athletes. Conversely, footing that is too wet, inconsistent, or lacks proper structure can lead to undue stress on tendons, ligaments, and joints, increasing the risk of lameness, falls, and debilitating injuries. Maintaining an ideal surface requires consistent effort and significant resources.

Traditionally, the primary method for dust suppression has involved frequent and substantial application of water. This approach, while temporarily effective, is highly inefficient and resource-intensive. Water evaporates quickly, especially in heated indoor arenas or arid outdoor climates, necessitating repeated applications, often multiple times a day. This frequent watering leads to considerable water consumption, escalating utility costs, and a significant labor burden for facility managers. Furthermore, relying solely on water does not inherently improve the structural characteristics or long-term stability of the footing material, leading to a continuous cycle of reapplication without a lasting solution to the underlying issues of footing quality.

To mitigate the shortcomings of simple watering, various chemical additives have been employed. These often include hygroscopic salts, which absorb moisture from the air to keep the footing damp. However, such salts can be corrosive to arena equipment, potentially irritating to horses' skin and hooves, and can accumulate in the footing over time, leading to environmental concerns due to runoff and long-term soil alteration. Other additives, such as certain oils or organic binders, have also been used, but these can unpredictably alter the texture of the footing, making it overly heavy, greasy, or inconsistent, and may present their own environmental concerns or disposal challenges. Some general-purpose compounds have been explored for soil conditioning and water retention in various contexts. However, these often exhibit properties that make them unsuitable or less than ideal for the specific demands of equine arena footing. Moreover, these fail to consistently achieve the desired balance of dust suppression, water conservation, and structural conditioning without adverse effects on performance or safety.

Therefore, a significant need exists for an improved composition and method that effectively and durably controls dust in equine performance arenas while simultaneously enhancing the physical characteristics of the footing, leading to a safer and more consistent surface. Such a solution must drastically reduce the reliance on frequent watering, overcome the drawbacks associated with conventional chemical additives, and provide superior, long-lasting results. As such, the present invention is adaptable to the wide range of soil chemistries and aggregate compositions found in different geographical regions. The present invention addresses these unmet needs by providing a composition and method that effectively combines a polyacrylamide polymer with a coagulant, such as aluminum sulfate, which amplifies the beneficial effects of the polyacrylamide on arena sands and soils. This combination achieves superior dust suppression and footing conditioning while also providing the flexibility to adjust the proportions of the active components to effectively treat diverse footing materials. Thereby, the present invention offers a more versatile, environmentally conscious, and practical solution for the global equestrian community.

In light of the devices disclosed in the known art, it is submitted that the present invention substantially diverges in design elements and methods from the known art and consequently it is clear that there is a need in the art for a composition and method for enhancing equine arena footing. In this regard the instant invention substantially fulfills these needs.

SUMMARY OF THE INVENTION

In view of the foregoing disadvantages inherent in the known types of compositions and methods for enhancing equine arena footing now present in the known art, the present invention provides a new composition and method for enhancing equine arena footing configured to suppress dust and improve footing conditioning.

It is an objective of the present invention to provide a composition and method for enhancing equine arena footing that achieves superior and long-lasting dust suppression. This objective is met by the synergistic interaction of polyacrylamide and a coagulant, which effectively binds dust particles and prevents their airborne dispersion. The resulting treated footing maintains a stable moisture content, significantly reducing the generation of respirable dust in equestrian environments.

It is an objective of the present invention to provide a composition and method for enhancing equine arena footing that substantially reduces the requirement for irrigation water. The inventive composition and method enhance the water retention properties of the footing, thereby decreasing the frequency and volume of water applications needed to maintain optimal conditions. This provides a quantifiable reduction in water usage, contributing to significant resource conservation for arena operators.

It is an objective of the present invention to provide a composition and method for enhancing equine arena footing that improves the physical characteristics and stability of the footing. The active components condition the footing by promoting flocculation of fine soil particles, which enhances the overall structure, cushioning, and consistency of the riding surface. This results in a more uniform and safer footing for equine athletes, minimizing the risk of injury associated with inconsistent ground.

It is an objective of the present invention to provide a composition and method for enhancing equine arena footing that is adaptable to a wide range of footing materials and soil chemistries. The composition's polyacrylamide to coagulant ratio is specifically configured to optimize performance based on characteristics such as clay content, colloid content, and particle size distribution. This adaptability ensures effective treatment across varied geographical locations and existing arena footing compositions.

It is an objective of the present invention to provide a composition and method for enhancing equine arena footing that offers an extended period of effectiveness. The durable binding and conditioning properties of the composition allow the treated footing to maintain optimal dust suppression and physical characteristics for a significantly longer duration compared to conventional watering. This prolonged efficacy reduces the frequency of reapplication, minimizing labor and material costs for arena maintenance.

It is therefore an object of the present invention to provide a new and improved composition and method for enhancing equine arena footing that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a process flow diagram of an embodiment of the method for enhancing equine arena footing.

DETAILED DESCRIPTION OF THE INVENTION

Reference is made herein to the attached drawings. Like reference numerals are used throughout the drawings to depict like or similar elements of the system. For the purpose of presenting a brief and clear description of the present invention, the embodiment discussed will be used for controlling dust and improving footing quality, thereby substantially reducing water consumption and ongoing maintenance efforts in equine arenas. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment," "second embodiment," or "third embodiment" does not necessarily refer to the same embodiment.

The composition for enhancing equine arena footing comprises a polyacrylamide (PAM) and a coagulant. These components are provided in a combined dry granular form, which facilitates handling, storage, and precise mixing. In one embodiment, the polyacrylamide is a non-ionic polyacrylamide. This particular type of PAM is characterized by a molecular weight ranging from approximately 5 million Daltons to 18 million Daltons. The non-ionic nature and specified molecular weight range of the polyacrylamide contribute to its effectiveness in forming stable solutions and interacting with soil particles without undesirable ionic reactions. Unlike ionic polyacrylamides, which can exhibit unpredictable or overly aggressive binding in the presence of charged ions derived from the coagulant or various soil minerals, non-ionic PAM provides a more controlled and consistent interaction. The composition minimizes the risk of creating overly sticky, clumpy, or excessively rigid footing, thereby ensuring optimal cushioning and workability for equine performance.

In the present embodiment, the coagulant component, which acts synergistically with the polyacrylamide, comprises aluminum sulfate. Aluminum sulfate is present in the dry granular composition at a concentration ranging from 1% to 15% by weight of the total dry granular composition. Aluminum sulfate as a coagulant exponentially increases the beneficial effects of the polyacrylamide on various sands, soils, and footing materials, providing a notable enhancement over polyacrylamide used alone, as shown in the Experimental Results section.

When the polyacrylamide and the coagulant are mixed with water and subsequently incorporated into equine arena footing, they are present in a ratio that is effective to synergistically suppress dust, significantly reduce water evaporation from the footing, and effectively condition the footing. The term "synergistically" denotes that the combined effect of the polyacrylamide and the coagulant is greater than the sum of their individual effects. Therefore, the composition, when in use, leads to improved binding of fine dust particles, greater water retention within the footing, and enhanced structural integrity.

The polyacrylamide to coagulant ratio is specifically configured for effective treatment of equine arena footing having predetermined physical and chemical characteristics. This adjustability addresses the inherent variability in soil composition across different geographical regions, wherein footing sands with high clay or colloid content exhibit drastically different chemical and physical properties compared to coarse-grained eolian or fluvial deposits with minimal fine particles. The predetermined physical and chemical characteristics that inform this ratio adjustment include, but are not limited to, the clay content, colloid content, and particle size distribution of the equine arena footing. By tailoring the ratio, the composition ensures optimal performance regardless of the specific footing makeup, allowing for a few different product options to be generally suitable for various locales and soil types.

When the dry granular composition is mixed with water, it forms a gel-like solution. This solution is characterized by a viscosity that is slightly greater than water, a consistency specifically designed to be suitable for consistent application through conventional watering systems, such as those typically found on arena watering trucks. The final solution for application comprises the combined polyacrylamide and coagulant at a concentration of 0.005% to 0.05% by weight of the total solution. The composition is further configured to flocculate fine soil particles within the equine arena footing. This flocculating action aids in binding smaller soil particles, such as colloids and clays, which further contributes to dust control and improved footing stability. In some embodiments, the dry composition consists of PAM and the coagulant.

In alternate embodiments, the coagulant component of the dry granular composition may comprise compounds other than aluminum sulfate, provided they are capable of synergistically interacting with polyacrylamide to promote flocculation of fine soil particles and enhance dust suppression within equine arena footing. In alternate embodiments coagulants include ferric sulfate, ferric chloride, polyaluminum chloride (PAC), and aluminum chloride. Additionally, organic coagulants such as tannin-based extracts or chitosan may be utilized in environmentally sensitive applications, providing biodegradable and less corrosive alternatives. In certain footing compositions, calcium hydroxide (lime) may also be employed to induce flocculation through pH modification and binding of clay particles. The selection of a specific coagulant and its ratio relative to the polyacrylamide component may be tailored to the physical and chemical properties of the footing, including clay content, colloid content, and particle size distribution. These alternate coagulants may be provided in dry granular form or dissolved into a liquid carrier, depending on application method and compatibility with standard watering systems.

Experimental Results

To evaluate the effectiveness of the composition in reducing moisture loss and enhancing footing conditioning, a series of controlled applications were conducted at multiple test points within a standard equine arena. Measurements were taken before and after grooming at specified intervals. The results demonstrate a consistent increase in moisture content post-grooming and application of the present invention, as well as improved moisture retention across test points following the application of the polyacrylamide and coagulant composition. In one embodiment, the dosing rate for the dry granular composition is approximately 0.29 grams per liter (0.29 g/L) of water, and the application volume is approximately 1 liter of solution per square meter (1 L/m$^2$) of arena surface. To determine the total quantity of solution required for a given arena area, the total surface area in square meters is multiplied by the application rate. For example, an arena measuring 250 square meters would require 250 liters of prepared solution. To calculate the amount of dry composition needed to dose this volume, the dosing rate is applied proportionally. At a rate of 0.29 grams per liter, treating 250 liters would require 72.5 grams of the dry granular formulation.

As used herein, the term "grooming" refers to the mechanical process of working, leveling, or otherwise manipulating the surface and subsurface layers of arena footing material using tools such as harrows, drags, cultivators, or rotary groomers. The term "moisture content" refers to the percentage of water present within the footing material, measured by weight or volume. Measurement of moisture content serves as a quantifiable indicator of the effectiveness of dust control provided by the present invention. In equine arena footing, dust is primarily generated when fine particles such as clay, silt, and organic matter become detached from the surface and suspended in the air. This detachment is significantly exacerbated under dry conditions, where the absence of moisture reduces cohesion between particles and allows them to become airborne with minimal disturbance. Moisture acts as a natural binding agent, promoting adhesion between fine particles and increasing their mass, which reduces their tendency to become suspended during equine activity.

TABLE 1

| Moisture and Temperature Readings at Multiple Test Points | | | | |
| --- | --- | --- | --- | --- |
| Test Point | Moisture Before Grooming | Sand Temp. Before Grooming | Moisture After Grooming | Sand Temp. After Grooming |
| Test Point 01 | 0.17-0.60 | 8°-11° C. | 0.21-0.68 | 6°-12° C. |
| Test Point 02 | 0.16-0.42 | 7°-13° C. | 0.31-0.64 | 4°-11° C. |

The moisture readings at Test Point 01 ranged from 0.17 to 0.60 before grooming and increased to 0.21 to 0.68 after grooming. Similarly, Test Point 02 showed moisture levels improving from 0.16 to 0.42 to 0.31 to 0.64 post-application. These results reflect improved water distribution and retention following the incorporation of the treatment composition. Additionally, sand temperature readings remained within optimal bounds, ranging from 7° C. to 13° C. across most points, indicating no adverse thermal effects from the application process. The provided test results support the efficacy of the composition in conditioning the footing, enhancing consistency, and preserving subsurface moisture, thereby reducing the frequency of water application and improving footing performance over time.

Referring now to FIG. 1, there is shown a process flow diagram of an embodiment of the method for enhancing equine arena footing. The present invention also provides a method for enhancing equine arena footing. This method comprises providing a dry granular composition 100 comprising the polyacrylamide and a coagulant is provided. Next, the dry granular composition is thoroughly mixed with water 200 within a watering system to form the solution, as previously described. The mixed solution is then applied 300 as an even coating to the surface of an equine arena. This application can be performed using various standard arena watering equipment, including, but not limited to, arena watering trucks or sprayers. Following the application of the solution, it is incorporated into the equine arena footing to a desired depth 400, ranging from approximately 2 inches to 6 inches, utilizing standard ground maintenance equipment. Such equipment may include, but is not limited to, harrows, drags, cultivators, or graders.

An exemplary use of the method involves assessing the specific physical and chemical characteristics of the arena footing prior to application. For instance, if the footing is identified as having a high clay content, a dry granular composition with a polyacrylamide to coagulant ratio specifically selected for such a composition would be provided. The dry granular composition, packaged for ease of use, is then introduced into the tank of a standard arena watering truck, where it is thoroughly mixed with water until a homogeneous gel-like solution is formed. In one embodiment, the solution comprises viscosity slightly greater than water having a measurable viscosity in the range of approximately 1.2 to 5 centipoise (cP) at room temperature (20-25° C.), where water has a baseline viscosity of approximately 1 cP. This slight increase in viscosity provides improved adhesion to footing materials during application without impeding flow through standard arena watering systems. The watering truck then applies an even coating of this solution across the arena surface. Immediately following application, the arena is groomed using a harrow, which effectively mixes the applied solution into the footing to the desired depth of 3-4 inches.

Through the implementation of this method, numerous benefits are achieved. The method provides effective dust suppression and consistent footing conditioning for an extended period, typically lasting from 6 to 12 weeks under average conditions before reapplication is needed. Furthermore, the method demonstrably results in a substantial reduction in water usage, with observed reductions ranging from 50% to 80% compared to maintaining untreated equine arena footing. The enhanced physical characteristics of the equine arena footing resulting from this method include, but are not limited to, improved cushioning, greater stability, and enhanced consistency, all of which contribute to a safer and more optimal surface for equestrian activities.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A composition for enhancing equine arena footing, comprising:
   a dry granular mixture of polyacrylamide (PAM) and a coagulant;
   wherein the PAM is a non-ionic polyacrylamide;
   wherein a weight ratio of the polyacrylamide to the coagulant is configured to reduce dust by at least 40% when the composition is activated with water and incorporated into the footing, relative to untreated footing;
   wherein the ratio of polyacrylamide to coagulant is adjustable to reduce dust based on the specific physical and chemical characteristics of the equine arena footing;
   wherein the ratio of polyacrylamide to coagulant is adjusted based on the clay content, colloid content, or particle size distribution of the equine arena footing.

2. The composition of claim 1, wherein the coagulant comprises aluminum sulfate.

3. The composition of claim 1, wherein the coagulant is present at a concentration of 1% to 15% by weight of the total dry granular mixture.

4. The composition of claim 1, wherein the composition further comprises water and is configured to form a solution having a viscosity greater than water.

5. The composition of claim 1, further configured to flocculate fine soil particles.

6. The composition of claim 1, wherein the composition is free of surfactants or detergents, and when mixed with water and applied to equine arena footing, the composition is distributed within and adheres to footing particles to retain moisture and reduce evaporation, thereby sustaining dust suppression.

7. A method for enhancing equine arena footing, comprising the steps of:
   providing a dry granular composition comprising a polyacrylamide (PAM) and a coagulant, wherein the PAM is non-ionic;
   mixing the dry granular composition with water in a watering system to form a solution;
   applying the solution as an even coating to an equine arena surface;
   incorporating the applied solution into an equine arena surface of the equine arena footing to a depth of 2 to 6 inches below the equine arena surface, wherein a weight ratio of the polyacrylamide to the coagulant is configured to reduce dust by at least 40% when the composition is activated with water and incorporated into the equine arena footing, relative to untreated footing.

8. The method of claim 7, wherein the coagulant comprises aluminum sulfate.

9. The method of claim 7, wherein the composition forms a hydrated, flowable aqueous composition that adheres to footing particles when mixed with water.

10. The method of claim 7, wherein the solution comprises the polyacrylamide and the coagulant at a combined concentration of 0.005% to 0.05% by weight of the solution.

11. The method of claim 7, wherein applying the solution to the equine arena surface is performed using a standard arena watering truck or sprayer.

12. The method of claim 7, wherein the ratio of polyacrylamide to coagulant in the dry granular composition is selected based on the specific physical and chemical characteristics of the equine arena footing.

13. The method of claim 12, wherein the ratio of polyacrylamide to coagulant is selected based on the clay content, colloid content, or particle size distribution of the equine arena footing.

14. The method of claim 7, wherein the dry granular composition with water mixture forms a solution at a concentration of approximately 0.29 grams of composition per liter of water.

15. The method of claim 14, wherein a solution application rate is approximately 1 liter of solution per square meter of arena surface area.

16. A composition for enhancing equine arena footing, comprising:
   a dry granular mixture of polyacrylamide (PAM) and a coagulant;
   wherein the PAM is a non-ionic polyacrylamide;
   wherein a weight ratio of the polyacrylamide to the coagulant is configured to reduce dust by at least 40% when the composition is activated with water and incorporated into the footing, relative to untreated footing;
   wherein the composition is free of surfactants or detergents, and when mixed with water and applied to equine arena footing, the composition is distributed within and adheres to footing particles to retain moisture and reduce evaporation, thereby sustaining dust suppression.

* * * * *